United States Patent
Sun

(10) Patent No.: US 10,432,982 B2
(45) Date of Patent: Oct. 1, 2019

(54) ADAPTIVE BITRATE STREAMING LATENCY REDUCTION

(71) Applicant: ARRIS Enterprises, Inc., Suwanee, GA (US)

(72) Inventor: Wendell Sun, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 30 days.

(21) Appl. No.: 14/886,454

(22) Filed: Oct. 19, 2015

(65) Prior Publication Data

US 2016/0119657 A1  Apr. 28, 2016

Related U.S. Application Data

(60) Provisional application No. 62/066,971, filed on Oct. 22, 2014.

(51) Int. Cl.
*H04N 7/173* (2011.01)
*H04N 21/234* (2011.01)
(Continued)

(52) U.S. Cl.
CPC ... *H04N 21/23406* (2013.01); *H04N 21/2187* (2013.01); *H04N 21/2353* (2013.01);
(Continued)

(58) Field of Classification Search
CPC ......... H04N 21/23406; H04N 21/2187; H04N 21/23418; H04N 21/23439;
(Continued)

(56) References Cited

U.S. PATENT DOCUMENTS

2003/0236907 A1* 12/2003 Stewart .................. H04L 29/06 709/231
2006/0282542 A1* 12/2006 Pinckney, III ..... H04N 21/6587 709/231

(Continued)

FOREIGN PATENT DOCUMENTS

EP  2685742 A2  1/2014

OTHER PUBLICATIONS

PCT Search Report & Written Opinion, Re: Application No. PCT/US2015/056208, dated Dec. 17, 2015.

(Continued)

*Primary Examiner* — Kyu Chae
(74) *Attorney, Agent, or Firm* — Thomas A. Ward

(57) ABSTRACT

A method of transmitting media content is provided that provides for a significantly reduced chunk size. The method includes receiving one or more adaptive transport streams into a memory buffer at a HTTP streamer from a media preparation unit. The received transport streams include a plurality of switchable segments each comprising one or more delivery chunks, the switchable segments being marked with segment boundary points and the delivery chunks being marked with chunk boundary points. One or more of the delivery chunks are then transmitted from a requested switchable segment to a requesting client device until a terminating segment boundary point is reached, wherein each delivery chunk is independently decodable, and a client device can begin decoding and rendering received delivery chunks even when the HTTP streamer has not yet completely received the entire requested switchable segment from the media preparation unit.

10 Claims, 8 Drawing Sheets

(51) Int. Cl.

| | |
|---|---|
| *H04N 21/2187* | (2011.01) |
| *H04N 21/2343* | (2011.01) |
| *H04N 21/262* | (2011.01) |
| *H04N 21/845* | (2011.01) |
| *H04N 21/235* | (2011.01) |
| *H04N 21/2383* | (2011.01) |
| *H04N 21/61* | (2011.01) |
| *H04N 21/643* | (2011.01) |

(52) U.S. Cl.
CPC ... *H04N 21/2383* (2013.01); *H04N 21/23418* (2013.01); *H04N 21/23439* (2013.01); *H04N 21/26258* (2013.01); *H04N 21/6118* (2013.01); *H04N 21/643* (2013.01); *H04N 21/8456* (2013.01)

(58) Field of Classification Search
CPC ........... H04N 21/2353; H04N 21/2383; H04N 21/26258; H04N 21/6118; H04N 21/643; H04N 21/8456
See application file for complete search history.

(56) References Cited

U.S. PATENT DOCUMENTS

| | | | | |
|---|---|---|---|---|
| 2012/0173753 | A1* | 7/2012 | Moorthy | H04N 21/23406 709/231 |
| 2013/0091251 | A1* | 4/2013 | Walker | H04N 21/6125 709/219 |
| 2014/0032777 | A1* | 1/2014 | Yuan | H04L 67/26 709/231 |
| 2014/0355603 | A1* | 12/2014 | Li | H04L 12/184 370/390 |
| 2015/0281752 | A1* | 10/2015 | Van Veldhuisen | H04N 21/2368 725/116 |

OTHER PUBLICATIONS

K. Mukta, et al., "On EBP specification and hybrid HTTP/IP multicast distribution", 103rd MPEG Meeting (Motion Picture Expert Group or ISO/IEC JTC1/SC29/WG11), No. m28237, Jan. 20, 2013.

T. Yasuaki, et al., "DASH: segment availability for low-latency live streaming", 100th MPEG Meeting (Motion Picture Expert Group or ISO/IEC JTC1/SC29/WG11), No. m24795, Apr. 25, 2012.

A. Giladi, "Low-latency live delivery in DASH", 102nd MPEG Meeting (Motion Picture Expert Group or ISO/IEC JTC1/SC29/WG11), No. m26652, Oct. 12, 2012.

Anonymous, "Technologies under Consideration for Dynamic Adaptive Streaming over HTTP 23009, parts 1 and 4", 101st MPEG Meeting (Motion Picture Expert Group or ISO/IEC JTC1/SC29/WG11), No. N12887, Jul. 26, 2012.

Official Action, Re: Canadian Application No. 2,965,484, dated Feb. 23, 2018.

OpenCable™ Specifications, Encoder Boundary Point Specification, Published Jan. 18, 2013, accessed at: https://apps.cablelabs.com/specification/encoder-boundary-point-specification/* document cited in IPRP.

\* cited by examiner

ADAPTIVE BITRATE STREAMING LATENCY REDUCTION

CLAIM OF PRIORITY

This Application claims priority under 35 U.S.C. § 119(e) from earlier filed U.S. Provisional Application Ser. No. 62/066,971, filed Oct. 22, 2014, which is hereby incorporated by reference.

TECHNICAL FIELD

The present disclosure relates to the field of digital video streaming, particularly regarding using Adaptive Transport Stream (ATS) and chunked transfer encoding to reduce latency in adaptive bitrate streams.

BACKGROUND

Streaming live or prerecorded media content to client devices such as set-top boxes, computers, smartphones, mobile devices, tablet computers, gaming consoles, and other devices over networks such as the internet has become increasingly popular. Delivery of such media content commonly relies on adaptive bitrate streaming technologies such as MPEG-DASH, HTTP Live Streaming (HLS), and HTTP Smooth Streaming.

A stream of media content encoded with adaptive bitrate streaming techniques is generally divided into multiple segments, each of which can be independently accessible. A client device can play a media stream by requesting and decoding a first segment, requesting and decoding a second segment, and continuing to request and decode subsequent segments for as long as the user of the client device desires to play the media content, or until playback reaches the end of the media content.

Additionally, segmentation of a stream can allow a client device to transition between different bitrate versions of the stream that have each been encoded at different quality levels. For instance, when network conditions are congested, a client device can begin playback of a media stream by requesting segments encoded with a low bitrate, but when network conditions improve the client device can transition to a higher quality version of the stream by requesting subsequent segments encoded at a higher bitrate.

While segmenting a media stream can be useful, conventional segmentation processes introduce delays, especially with transmission of live content. In most adaptive bitrate streaming implementations, a server can only provide complete segments to requesting client devices. However, segments generally have a length of at least a few seconds, such as 2 to 10 seconds. As such, initial delivery of the stream to end users cannot begin until the first segment is complete. This introduces a delay of at least the length of the segment before otherwise live content can be viewed. Additionally, because the first segment is delayed in this manner, all subsequent segments will be similarly delayed and the video will never catch up to real time.

These types of delays can be frustrating for users. For instance, live sports broadcasts are popular, and viewers generally would like to see events on screen as soon as possible after they occur in the stadium. However, even if the length of each segment is relatively short, such as two seconds, each two seconds of content must be completely encoded and encapsulated into a segment before it can be sent to client devices. As such, events shown on screen will always be at least two seconds behind real-time due to the segmentation process. Such delays can be disappointing for fans, because when an exciting event happens during a game, they may learn about it first through an online scoreboard or over the radio before they actually see it happen on screen.

While some viewers may not care if live video is received on a delayed basis, those viewers can still be irritated by the time it takes to begin viewing a video stream. Because the first video segment needs to be completely encoded and encapsulated before it can be sent to the viewer's device, there can be a delay at least equal to the segment size, such as 2-10 seconds, after the viewer requests the video stream before it begins playing for the viewer. For viewers accustomed to the immediate tuning times offered by conventional television, a multi-second tuning delay can be frustrating.

One approach to decreasing this type of tuning delay can be to shorten the segment size. For example, instead of the 10 second segments commonly used in some current streaming technologies, the segment size could be shortened to 2 seconds so that the decoding device can begin playback after receiving the first 2 seconds of content. However, all segments are generally encoded with a leading anchor frame that uses more data than other frames. As such, decreasing the segment size requires more anchor frames and utilizes more data, which can decrease coding efficiency and impact bandwidth usage and performance. Additionally, decreasing the segment size would result in more segments overall, and would accordingly increase the number of HTTP requests and replies needed to deliver them to client devices.

SUMMARY

What is needed is a system and method for sending delivery chunks from an individual switchable segment within a continuous adaptive transport stream using chunked transfer encoding, even when the sending device does not yet know the full size of the switchable segment, or even if the sending device does not yet have a complete copy of the switchable segment. This can allow transmission, decoding, and rendering of live content to begin almost immediately after a client device requests a switchable segment, without waiting for a complete switchable segment to be encoded and sent.

In one embodiment, the present disclosure provides for a method of transmitting media content, the method comprising receiving an adaptive transport stream description at an HTTP streamer from a media preparation unit, the adaptive transport stream description describing media content available from the media preparation unit as one or more adaptive transport streams, wherein each of the one or more adaptive transport streams are continuous streams comprising a plurality of switchable segments each comprising one or more delivery chunks, the switchable segments being marked with segment boundary points and the delivery chunks being marked with chunk boundary points, wherein positions between each of the plurality of switchable segments are positions at which a client device can switch to a different one of the one or more adaptive transport streams, publishing a playlist with the HTTP streamer listing identifiers for one or more of the plurality of switchable segments, receiving the one or more adaptive transport streams into a memory buffer at the HTTP streamer from the media preparation unit, receiving a request at the HTTP streamer from the client device for a particular switchable segment identified on the playlist, and responding to the request using chunked transfer encoding by transmitting one or more delivery chunks from the particular switchable segment to the client device until a terminating segment boundary point is reached, wherein each of the one or more delivery chunks are portions of a single switchable segment that are independently decodable by the client device, such that the HTTP streamer is configured to begin sending delivery chunks from a requested switchable segment and the client device can begin decoding and rendering received delivery chunks even when the HTTP streamer has not yet completely received the requested switchable segment from the media preparation unit.

In another embodiment, the present disclosure provides for a method of encoding media content, the method comprising receiving a piece of media content from a source at a media preparation unit, encoding the piece of media content with the media preparation unit into a plurality of adaptive transport streams at varying bitrate levels, each of the plurality of adaptive transport streams being a continuous stream comprising a plurality of switchable segments such that a decoding device can switch from one of the plurality of adaptive transport streams to a different one of the plurality of adaptive transport streams at positions between adjacent switchable segments, encoding each of the plurality of adaptive transport streams with the media preparation unit such that each of the plurality of switchable segments comprises one or more delivery chunks, wherein each delivery chunk within a particular switchable segment is an independently decodable portion of the particular switchable segment, marking each of the plurality of adaptive transport streams with a plurality of segment boundary points that mark beginning and/or end points of each of the switchable segments within the adaptive transport stream, and marking each of the plurality of adaptive transport streams with a plurality of chunk boundary points that mark beginning and/or end points of each of the delivery chunks within each switchable segment within the adaptive transport stream.

In another embodiment, the present disclosure provides for a method of transmitting media content, the method comprising receiving a piece of media content from a source at a media preparation unit, encoding the piece of media content with the media preparation unit into a plurality of adaptive transport streams at varying bitrate levels, each of the plurality of adaptive transport streams being a continuous stream comprising a plurality of switchable segments such that a decoding device can switch from one of the plurality of adaptive transport streams to a different one of the plurality of adaptive transport streams at positions between adjacent switchable segments, encoding each of the plurality of adaptive transport streams with the media preparation unit such that each of the plurality of switchable segments comprises one or more delivery chunks, wherein each delivery chunk within a particular switchable segment is an independently decodable portion of the particular switchable segment, marking each of the plurality of adaptive transport streams with a plurality of segment boundary points that mark beginning and/or end points of each of the switchable segments within the adaptive transport stream, marking each of the plurality of adaptive transport streams with a plurality of chunk boundary points that mark beginning and/or end points of each of the delivery chunks within each switchable segment within the adaptive transport stream, transmitting an adaptive transport stream description describing the plurality of adaptive transport streams to an HTTP streamer from the media preparation unit, publishing a playlist with the HTTP streamer listing identifiers for one or more of the plurality of switchable segments, receiving the plurality of adaptive transport streams into a memory buffer at the HTTP streamer from the media preparation unit, receiving a request at the HTTP streamer from a client device for a particular switchable segment identified on the playlist, and responding to the request using chunked transfer encoding by transmitting one or more delivery chunks from the particular switchable segment to the client device until a terminating segment boundary point is reached, wherein the HTTP streamer is configured to begin sending delivery chunks from a requested switchable segment and the client device can begin decoding and rendering received delivery chunks even when the HTTP streamer has not yet completely received the requested switchable segment from the media preparation unit.

BRIEF DESCRIPTION OF THE DRAWINGS

Further details of the present invention are explained with the help of the attached drawings in which.

DETAILED DESCRIPTION

Figure 1:
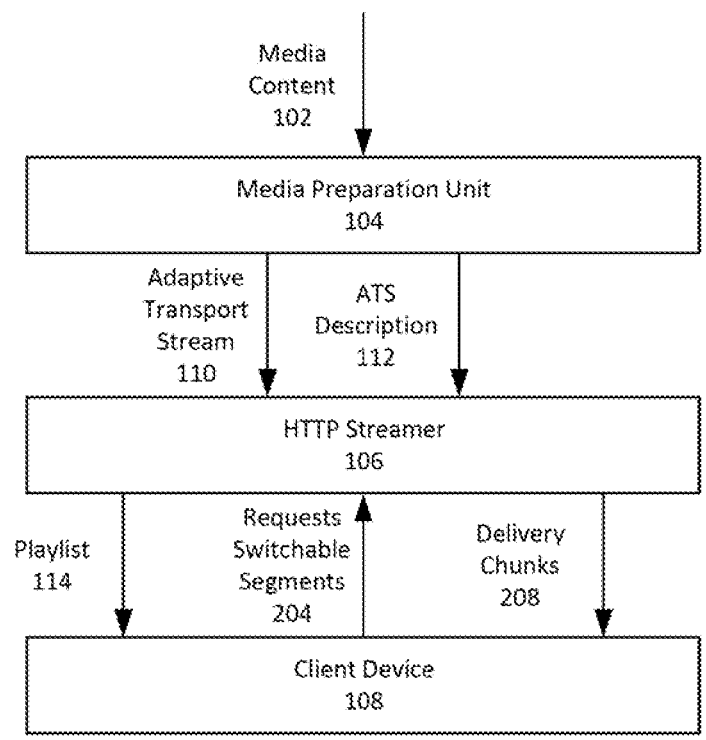
FIG. 1 depicts a system for delivering media content, comprising an HTTP streamer in communication with a media preparation unit and one or more client devices.

FIG. 1 depicts a system for delivering media content 102. A media preparation unit 104 can selectively communicate and/or exchange data with an HTTP streamer 106, and one or more client devices 108 can selectively communicate and/or exchange data with the HTTP streamer 106.

The media preparation unit 104 can be an encoder and/or transcoder comprising one or more processors, data storage systems or memory, and/or communication links or interfaces. The media preparation unit 104 can receive media content 102 from a source, such as a broadcaster or content provider. The media content 102 can comprise audio and/or video. In some embodiments and/or situations the media content 102 can be a live broadcast, while in other embodiments and/or situations the media content 102 can be prerecorded. The media preparation unit 104 can be configured to encode and/or transcode the received media content 102 into at least one adaptive transport stream 110. In some situations and/or embodiments, the media preparation unit 104 can encode and/or transcode the received media content 102 into a plurality of alternate adaptive transport streams 110, such as different versions each encoded at a different quality level or bitrate.

Figure 2:
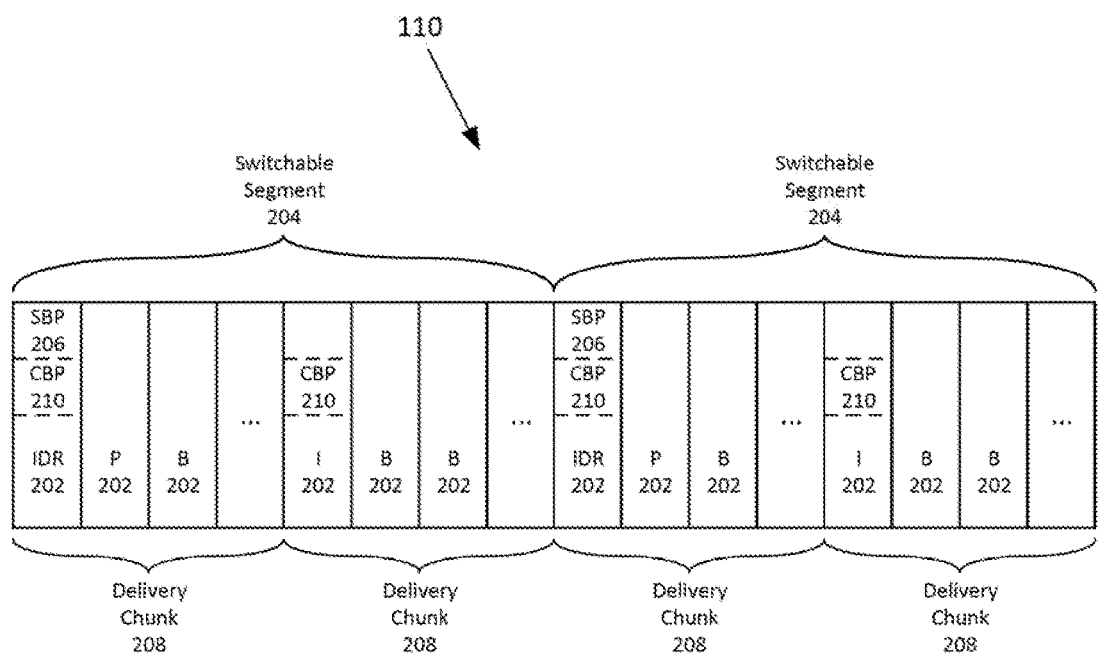
FIG. 2 depicts a portion of a non-limiting example of an adaptive transport stream.

FIG. 2 depicts a portion of a non-limiting example of an adaptive transport stream 110. The adaptive transport stream 110 can be a continuous transport stream. By way of a non-limiting example, the adaptive transport stream 110 can be a continuous MPEG2 transport stream. In some embodiments, the adaptive transport stream 110 can be prepared by the media preparation unit 104 according to a specification such as the CableLabs® OpenCable™ specification, however in other embodiments the media preparation unit 104 can prepare the adaptive transport stream 110 in any other desired format.

The adaptive transport stream 110 can comprise a succession of groups of pictures (GOPs), each GOP comprising one or more frames 202. Each frame 202 can be encoded and decoded through intra-prediction and/or inter-prediction. An intra-predicted frame 202, also referred to as an I-frame or key frame, can be encoded and decoded independently of other frames 202 using only data within the I-frame. An inter-predicted frame 202 can be encoded and decoded with reference to one or more other frames 202, for example by encoding differences between the inter-predicted frame 202 and one or more reference frames 202. Inter-predicted frames 202 that can be encoded and decoded with reference to previous frames 202 can be called P-frames. Inter-predicted frames 202 that can be encoded and decoded with reference to both previous and subsequent frames 202 can be called B-frames. Each GOP can begin with an I-frame, so that a decoding device can independently decode the leading I-frame and then use that decoded information to help decode any following P-frames or B-frames within the GOP.

A plurality of independently decodable switchable segments 204 can be present within the adaptive transport stream 110, as shown in FIG. 2. By way of a non-limiting example, each switchable segment 204 can be a portion of the adaptive transport stream 110, such as a 2 to 10 second portion of the media content 102. Each individual switchable segment 204 can comprise one or more GOPs.

Positions between each switchable segment 204 in the adaptive transport stream 110 can be positions at which client devices 108 can switch between different versions of the adaptive transport stream 110. By way of a non-limiting example, a client device 108 experiencing network congestion can request and play back switchable segments 204 from a version of the adaptive transport stream 110 that was encoded at a relatively low bitrate suitable for delivery over the network at current congestion levels. However, when the client device 108 reaches the end of a switchable segment 204 and determines that network conditions have improved, the client device 108 can request the next switchable segment 204 from a different version of the adaptive transport stream 110 that was encoded at a higher bitrate.

Although the adaptive transport stream 110 can be encoded as a continuous transport stream, the media preparation unit 104 can provide information that indicates segment boundary points 206 at positions within the continuous adaptive transport stream 110. The segment boundary points 206 can indicate the start and/or end of each switchable segment 204 within the continuous adaptive transport stream 110.

In some embodiments, the segment boundary points 206 can be identified within private data associated with the adaptive transport stream 110. By way of a non-limiting example, the segment boundary points 206 can be the encoder boundary points (EBPs) that are marked when content is encoded according to the CableLabs® OpenCable™ specification. In other embodiments, the segment boundary points 206 can be identified in public data associated with the adaptive transport stream 110, such as segment boundary descriptors within public MPEG data fields. In still other embodiments, the location of segment boundary points 206 can be inferred from other data. By way of a non-limiting example, the first frame 202 of each switchable segment 204 can be encoded as special type of I-frame, known as an IDR (Instantaneous Decoder Refresh) frame that indicates to a decoding device that its reference picture buffer should be cleared. Each IDR frame can indicate the beginning of a switchable segment 204, such that identification of an IDR frame can also indicate a segment boundary point 206.

Each switchable segment 204 can comprise one or more delivery chunks 208. Each delivery chunk 208 can be a portion of a switchable segment 204, such as a single frame 202, a partial GOP, or one or more full GOPs.

In some embodiments each delivery chunk 208 can be an independently decodable subsection of a switchable segment 204, such that a decoding device can immediately decode and render each delivery chunk 208 upon receipt without waiting for additional delivery chunks 208. By way of a non-limiting example, a delivery chunk 208 can be a single 8-frame GOP taken from a larger ten second switchable segment 204 comprising a plurality of GOPs. By way of another non-limiting example, when a switchable segment 204 comprises all I-frames, its delivery chunks 208 can be individual frames 202 since each can be independently decoded.

As shown in FIG. 2, the media preparation device 104 can indicate the locations of chunk boundary points 210 within the adaptive transport stream 110 through public or private data, similarly to how segment boundary points 206 can be indicated. Each chunk boundary point 210 can mark the beginning and/or end of a delivery chunk 208 within a switchable segment 204.

Returning to FIG. 1, the media preparation unit 104 can provide an HTTP streamer 106 with access to the adaptive transport streams 110 over a network such as the internet or any other data network. The HTTP streamer 106 can join a multicast group associated with the media preparation unit 104 to begin receiving an adaptive transport stream 110

The HTTP streamer 106 can be a packager and/or server configured to deliver individual switchable segments 204 from adaptive transport streams 110 to client devices 108 that have requested them. The HTTP streamer 106 can comprise an Internet Protocol television (IPTV) server, over-the-top (OTT) server, or any other type of server or network element. The HTTP streamer 106 can have one or more processors, data storage systems or memory, and/or communication links or interfaces. As shown below in FIG. 4, the HTTP streamer 106 can have one or more memory buffers 402 into which it can at least temporarily store received portions of adaptive transport streams 110.

Each client device 108 can be a set-top box, cable box, television, computer, smartphone, mobile device, tablet computer, gaming console, or any other device configured to request, receive, and play back switchable segments 204. Client devices 108 can have one or more processors, data storage systems or memory, and/or communication links or interfaces.

In some embodiments the HTTP streamer 106 can also receive an adaptive transport stream description 112 from the media preparation unit 104. The adaptive transport stream description 112 can be a media presentation description (MPD), manifest, or other information that describes one or more adaptive transport streams 110 that are available to the HTTP streamer 106 from the media preparation unit 104. By way of a non-limiting example, the media preparation unit 104 can provide the HTTP streamer 106 with an adaptive transport stream description 112 that describes a piece of media content 102, such as the name of the media content 102 and identifiers for a plurality of different adaptive transport stream 110 versions of that media content 102 that are, or will be, available at different bitrates from the media preparation unit 104.

The HTTP streamer 106 can use the adaptive transport stream description 112 to generate a playlist 114 for client devices 108 that describes the media content 102 and available switchable segments 204. The playlist 114 can be a MPD, manifest, or other information that describes one or more switchable segments 204 that can be requested by client devices 108 from the HTTP streamer 106. By way of a non-limiting example, the playlist 114 can be a DASH (Dynamic Adaptive Streaming over HTTP) MPD. The HTTP streamer 106 can publish the playlist 114 for client devices 108.

Figure 3A:
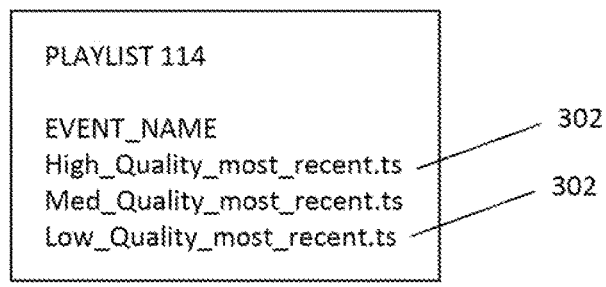
FIG. 3A depicts an exemplary embodiment of a playlist listing virtual identifiers.

FIG. 3A depicts a first embodiment of a playlist 114. In some embodiments or situations, such as when the media content 102 is a live broadcast and client devices 108 are likely to request the newest switchable segment 204 in to present the media content 102 as close to live as possible, the HTTP streamer 106 can prepare the playlist 114 with virtual identifiers 302 that link to versions of the most recent switchable segment 204 in the adaptive transport stream 110. By way of a non-limiting example, the HTTP streamer 106 can prepare a playlist 114 that lists virtual identifiers 302 for each quality level of the adaptive transport stream 110 available from the media preparation unit 104, such as versions encoded at different bitrates. Client devices 108 can use the virtual identifiers 302 in the playlist 114 to request the most recent switchable segment 204 at a desired quality level from the HTTP streamer 106, without knowing the specific identifier or URL of the most recent switchable segment 204 at the HTTP streamer 106.

Figure 3B:
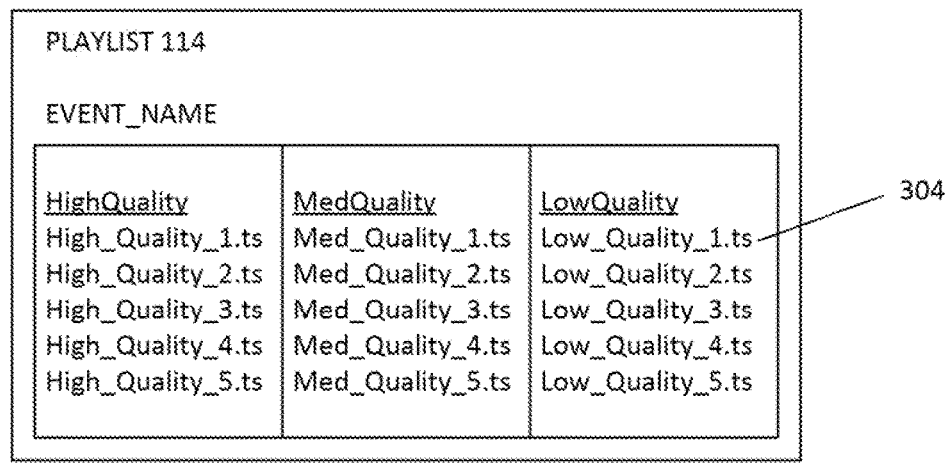
FIG. 3B depicts an exemplary embodiment of a playlist listing segment identifiers.

FIG. 3B depicts an alternate embodiment of a playlist 114. In alternate embodiments, the HTTP streamer 106 can list unique segment identifiers 304, such as file names or URLs, for specific switchable segments 204 on the playlist 114. The HTTP streamer 106 can analyze portions of an adaptive transport stream 110 that it has received in a memory buffer 402 to identify at least partially received switchable segments 204, and add segment identifiers 304 for those switchable segments 204 on the playlist 114. In some embodiments a playlist 114 can list segment identifiers 304 for alternate versions of each switchable segment 204, such as parallel switchable segments 204 from adaptive transport streams 110 encoded at different bitrates.

In these embodiments the HTTP streamer 106 can include a segment identifier 304 for a new switchable segment 204 on the playlist 114 as soon as it begins to receive a portion of the new switchable segment 204, even if it has not yet received the full switchable segment 204. By way of a non-limiting example, the HTTP streamer 106 can add a segment identifier 304 for a new switchable segment 204 to the playlist 114 as soon as it encounters a new segment boundary point 206 in the adaptive transport stream 110, even if it has not yet received another segment boundary point 206 that marks the end of that switchable segment 204 and the beginning of the next switchable segment 204. In the case of live content, the HTTP streamer 106 can update the playlist 114 with new segment identifiers 304 as more of the adaptive transport stream 110 is received in its memory buffer 402 and new switchable segments 204 are identified.

When a client device 108 uses a playlist 114 to request switchable segments 204, the HTTP streamer 106 can use the segment boundary points 206 to identify endpoints of individual switchable segments 204 within the adaptive transport stream 110, and as such can package and/or deliver individual switchable segments 204 from the continuous adaptive transport stream 110 to client devices 108 that have requested them. HTTP can be used as a content delivery mechanism to transport the switchable segments 204 from the HTTP streamer 106 to a requesting client device 108 over a network such as the internet or any other data network. The HTTP streamer 106 can transmit individual switchable segments 204 to a client device 108 as segments of an adaptive bitrate streaming technology used by the client device 108, such as MPEG-DASH, HTTP Live Streaming (HLS), or HTTP Smooth Streaming.

Figure 4:
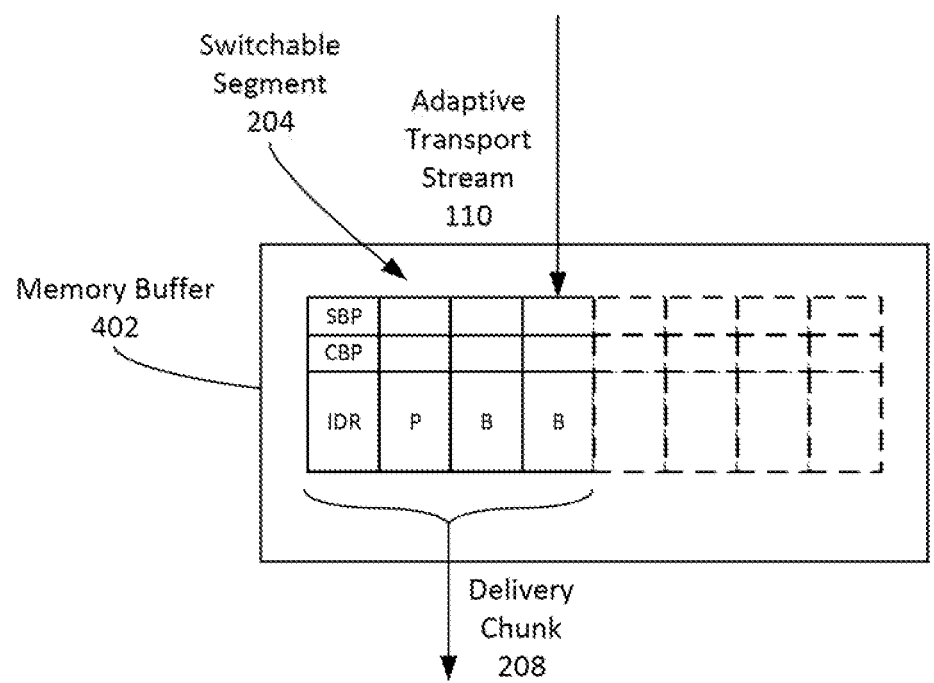
FIG. 4 depicts a portion of an adaptive transport stream being received into a memory buffer at an HTTP streamer.

In some embodiments, the HTTP streamer 106 can use zero-copy segmentation to transmit data associated with a single switchable segment 204 to a requesting client device 108. In these embodiments, the HTTP streamer 106 can receive data from an adaptive transport stream 110 into a memory buffer 402, as shown in FIG. 4. In some embodiments, the memory buffer 402 can hold up to a predetermined amount of data from an adaptive transport stream 110, such as the most recent n seconds of media content 102 received, the most recent n bytes received, the most recent n switchable segments 204 received, or any other measure of data.

Using zero-copy segmentation, when a particular switchable segment 204 has been requested by a client device 108, the HTTP streamer 106 can transmit the data associated with that switchable segment 204 to the requesting client device 108 directly from the memory buffer 402, without first copying the data to a different memory location or copying the data into one or more separate files. By way of a non-limiting example, the HTTP streamer 106 can keep track of bit ranges in the received adaptive transport stream 110 in its memory buffer 402 that correspond to different switchable segments 204 within the adaptive transport stream 110, and the HTTP streamer 106 can use those bit ranges to provide a client device 108 with a requested switchable segment 204 directly from the portion of the adaptive transport stream 110 in the memory buffer 402. Similarly, the HTTP streamer 106 can use zero-copy segmentation to transmit individual delivery chunks 208 from a larger switchable segment 204 to client devices 108 from the memory buffer 402 using zero-copy segmentation.

The HTTP streamer 106 can use chunked transport encoding (CTE), as defined in HTTP 1.1, to sequentially deliver individual delivery chunks 208 from each requested switchable segment 204 to a requesting client device 108. As discussed above, the size of each delivery chunk 208 can be selected to be as small as a single frame 202, or can be selected as any other size between a single frame 202 and the full switchable segment 204. In some embodiments, the HTTP streamer 106 can identify the beginning and/or end points of each delivery chunk 208 within a requested switchable segment 204 from chunk boundary points 210 added by the media preparation unit 104 during encoding of the adaptive transport stream 110.

With chunked transport encoding, the HTTP streamer 106 can begin transmitting portions of a requested switchable segment 204 to a client device 108 as delivery chunks 208 from its memory buffer 402, even if the HTTP streamer 106 has not yet received the full switchable segment 204 and does not yet know the full size of the switchable segment 204.

By way of a non-limiting example, an HTTP streamer 106 can receive a live broadcast substantially in real time from a media preparation unit 104 as an adaptive transport stream 110. As soon as the HTTP streamer 106 finds segment boundary point 206 that indicates the beginning of a switchable segment 204 within the adaptive transport stream 110, the HTTP streamer 106 can use chunk boundary points 210 to identify decodable delivery chunks 208 within that switchable segment 204. Once the HTTP streamer 106 determines from the chunk boundary points 210 that it has received a complete delivery chunk 208 in its memory buffer 402, it can send that delivery chunk 208 to a requesting client device 108, even if the HTTP streamer 106 has not received further delivery chunks 208 from the switchable segment, or further portions of the adaptive transport stream 110 that contain a segment boundary point 206 indicating the end of the switchable segment 204. The HTTP streamer 106 can continue receiving more of the adaptive transport stream 110 in real time from the media preparation unit 104 and can continue sending additional delivery chunks 208 to the client device 108, until the next segment boundary point 206 in the adaptive transport stream 110 is received and processed. At that point the HTTP streamer 106 can send the client device 108 an indication that the requested switchable segment 204 has concluded, such as a final delivery chunk 208 with a length of zero.

Figure 5:
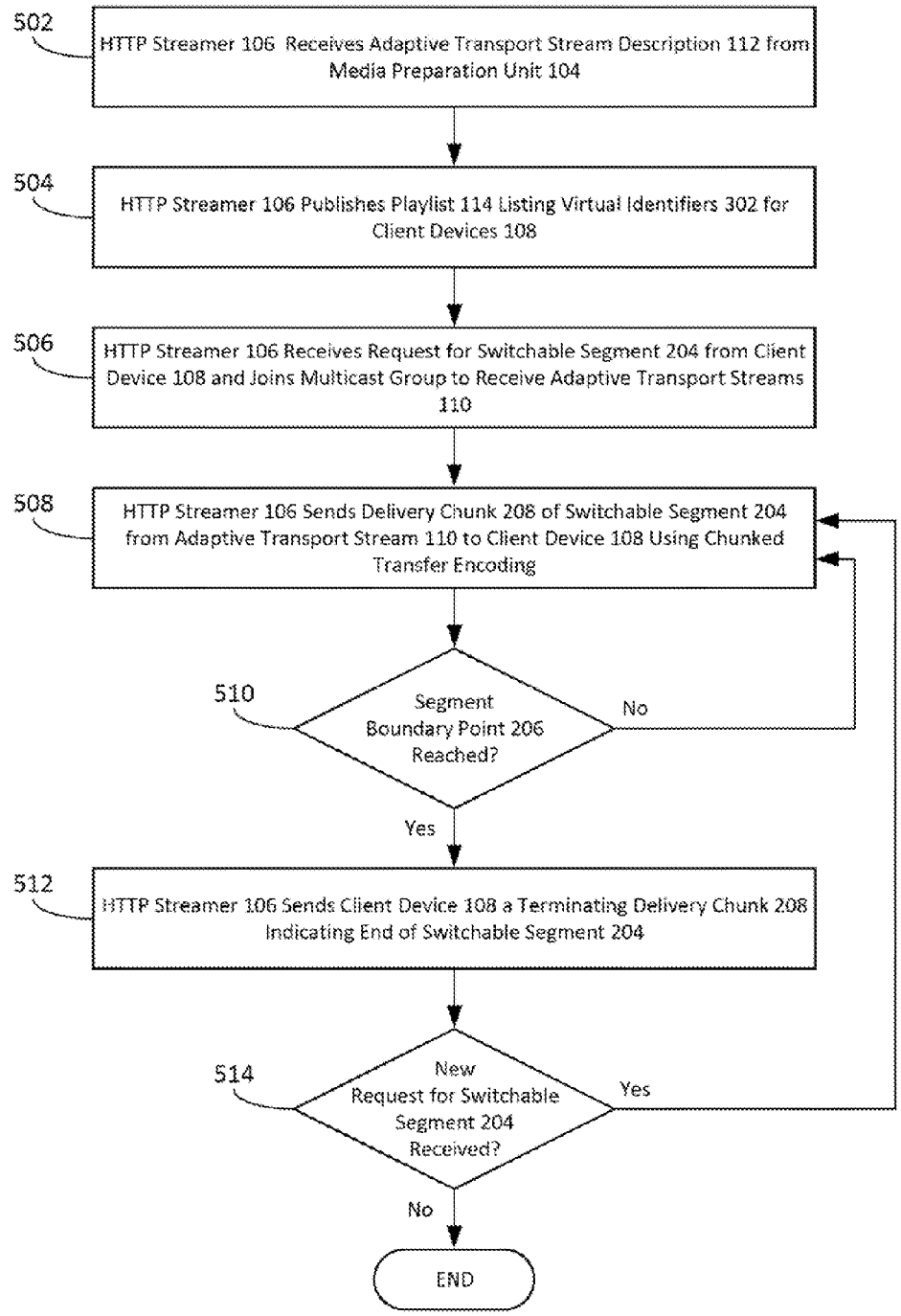
FIG. 5 depicts a first exemplary process for transmitting an adaptive transport stream from an HTTP streamer to client devices using chunked transfer encoding.

FIG. 5 depicts a first exemplary process for transmitting data from one or more adaptive transport streams 110 from an HTTP streamer 106 to client devices 108 using chunked transfer encoding. The process of FIG. 5 can be used when the media content 102 is a live broadcast and client devices 108 desire to play back the live content in near-real time.

At step 502, the HTTP streamer 106 can receive an adaptive transport stream description 112 from the media preparation unit 104 associated with a piece of media content 102, such as a live broadcast. The adaptive transport stream description 112 can describe information about the media content 102 and one or more associated adaptive transport streams 110 available from the media preparation unit 104, such as different versions of the media content 102 encoded at different bitrates. The media preparation unit 104 can have encoded, or be in the process of encoding, each adaptive transport stream 110 identified in the adaptive transport stream description 112 with segment boundary points 206 that indicate beginning and/or end points of individual switchable segments 204 within the continuous adaptive transport stream 110, as well as chunk boundary points 210 that mark beginning and/or end points of delivery chunks 208 within each switchable segment 204.

At step 504, the HTTP streamer 106 can publish a playlist 114 for client devices 108. The HTTP streamer 106 can use the adaptive transport stream description 112 to determine the quality levels available from the media preparation unit, and list virtual identifiers 302 for the most recent switchable segment 204 in each available quality level on the playlist 114, as shown in FIG. 3A.

At step 506, the HTTP streamer 106 can receive a request from a client device 108 for a version of most recent switchable segment 204. By way of a non-limiting example, a client device 108 can use one of the virtual identifiers 302 on the playlist 114 to request the most recent switchable segment 204 at a desired quality level, in order to play back the media content 102 in near real-time. If the HTTP streamer 106 has not already begun to receive the adaptive transport streams 110 from the media preparation unit 104, the HTTP streamer 106 can join a multicast group associated with the media preparation unit 104, and can begin receiving the adaptive transport streams 110 into its memory buffer 402.

At step 508, the HTTP streamer 106 can used chunked transfer encoding to transmit a delivery chunk 208 from the requested switchable segment 204 to the requesting client device 108. In some embodiments, the HTTP streamer 106 can use zero-copy segmentation to send data associated with the requested switchable segment 204 directly to the requesting client device 108 from its memory buffer 402.

Figure 6A:
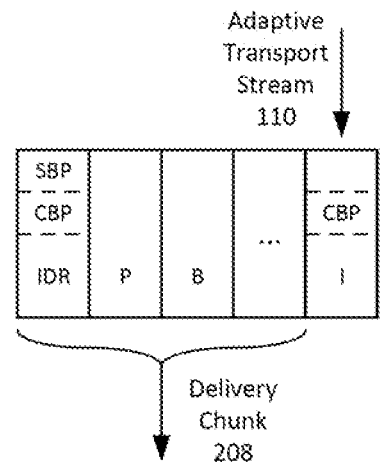
FIGS. 6A-6C depict an example of a switchable segment of an adaptive transport stream being received into a memory buffer and delivery chunks of that switchable segment being transmitted to a requesting client device.

The first delivery chunk 208 sent in response to the client device's request for the most recent switchable segment 204 can be the most recent full delivery chunk 208 held in the HTTP streamer's memory buffer 402. The HTTP streamer 106 can use chunk boundary points 210 inserted by the media preparation unit 104 to identify the delivery chunks 208 within the portion of the adaptive transport stream 110 held in its memory buffer 402. By way of a non-limiting example, FIG. 6A depicts a switchable segment 204 that has been partially received within the HTTP streamer's memory buffer 402. Although only a few frames 202 have been received in memory out of the full switchable segment 204, a full delivery chunk 208 bounded by chunk boundary points 210 have been received and the HTTP streamer 106 can send that delivery chunk 208 to a requesting client device 108. As the media preparation unit 104 inserted the chunk boundary points 210 within the adaptive transport stream 110 to mark independently decodable portions of the media content 102, the client device 108 can immediately begin decoding the delivery chunk 208 and playing back its frames 202 even if other parts of the switchable segment 204 have not yet been received.

Figure 6B:
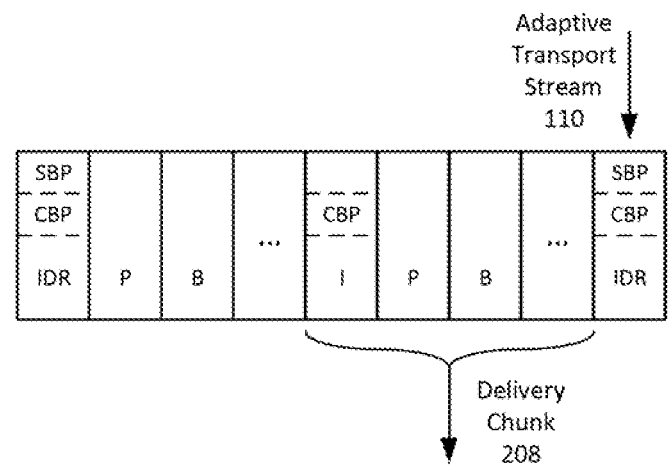

The HTTP streamer 106 can track its location within the switchable segment 204 when responding to a request from a client device 108, such that the next delivery chunk 208 after the most recently sent delivery chunk 208 can be subsequently sent to the client device 108 if appropriate. By way of a non-limiting example, FIG. 6B depicts a situation in which the HTTP streamer 106 has already sent a first delivery chunk 208 from a switchable segment 204 to a requesting client device 108, and follows by sending a second delivery chunk 208 from the same switchable segment when it receives and detects a chunk boundary point 210 indicating the end of the second delivery chunk 208.

Figure 6C:
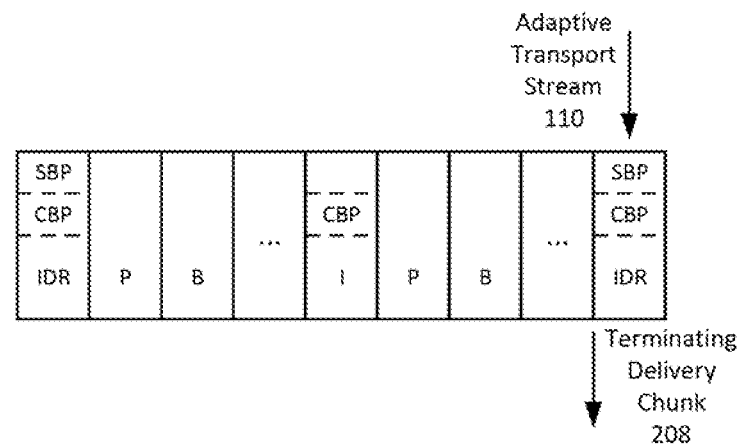

At step 510, the HTTP streamer 106 can determine if it has reached a segment boundary point 206 within the adaptive transport stream 110. If, after sending a delivery chunk 208 to the client device 108 the HTTP streamer 106 has not yet reached a segment boundary point 206 within the adaptive transport stream 110, the HTTP streamer 106 can return to step 508 to transmit the next delivery chunk 208 from the requested switchable segment 204 to the requesting client device 108 using chunked transfer encoding. However, if the HTTP streamer 106 determines during step 510 that it has reached a segment boundary point 206 within the adaptive transport stream 110, the HTTP streamer 106 can determine that it has reached the endpoint of the current switchable segment 204, and can move to step 512. By way of a non-limiting example, FIGS. 6B-6C depicts a situation in which the HTTP streamer 106 sends a delivery chunk 208 to a client device 108 and then encounters a segment boundary point 206 as the next piece of data within the portion of the adaptive transport stream 110 in its memory buffer 402.

At step 512, the HTTP streamer 106 can transmit a terminating delivery chunk 208 to the client device 108, to indicate the end of the switchable segment 204 that was requested by the client device 108. As described above, in some embodiments the terminating delivery chunk 208 can have a length of zero. The terminating delivery chunk 208 can indicate to the requesting client device 108 that the last delivery chunk 208 associated with the requested switchable segment 204 has been sent, and the end of the switchable segment 204 has been reached.

After receiving a terminating delivery chunk 208, the client device 108 can either use the playlist 114 to request the next switchable segment 204 from an adaptive transport stream 110 at the same or a different quality level, or end playback of the media content 102.

During step 514 the HTTP streamer 106 can determine whether a new request for a switchable segment 204 has been received from the requesting client device 108. If the client device 108 has requested another switchable segment 204, the HTTP streamer 106 can return to step 508 to begin transmitting delivery chunks 208 of the requested switchable segment 204 to the client device 108. If the client device 108 has not requested an additional switchable segment 204, the process can end, and/or the HTTP streamer 106 can wait for future requests for switchable segments 204.

Figure 7:
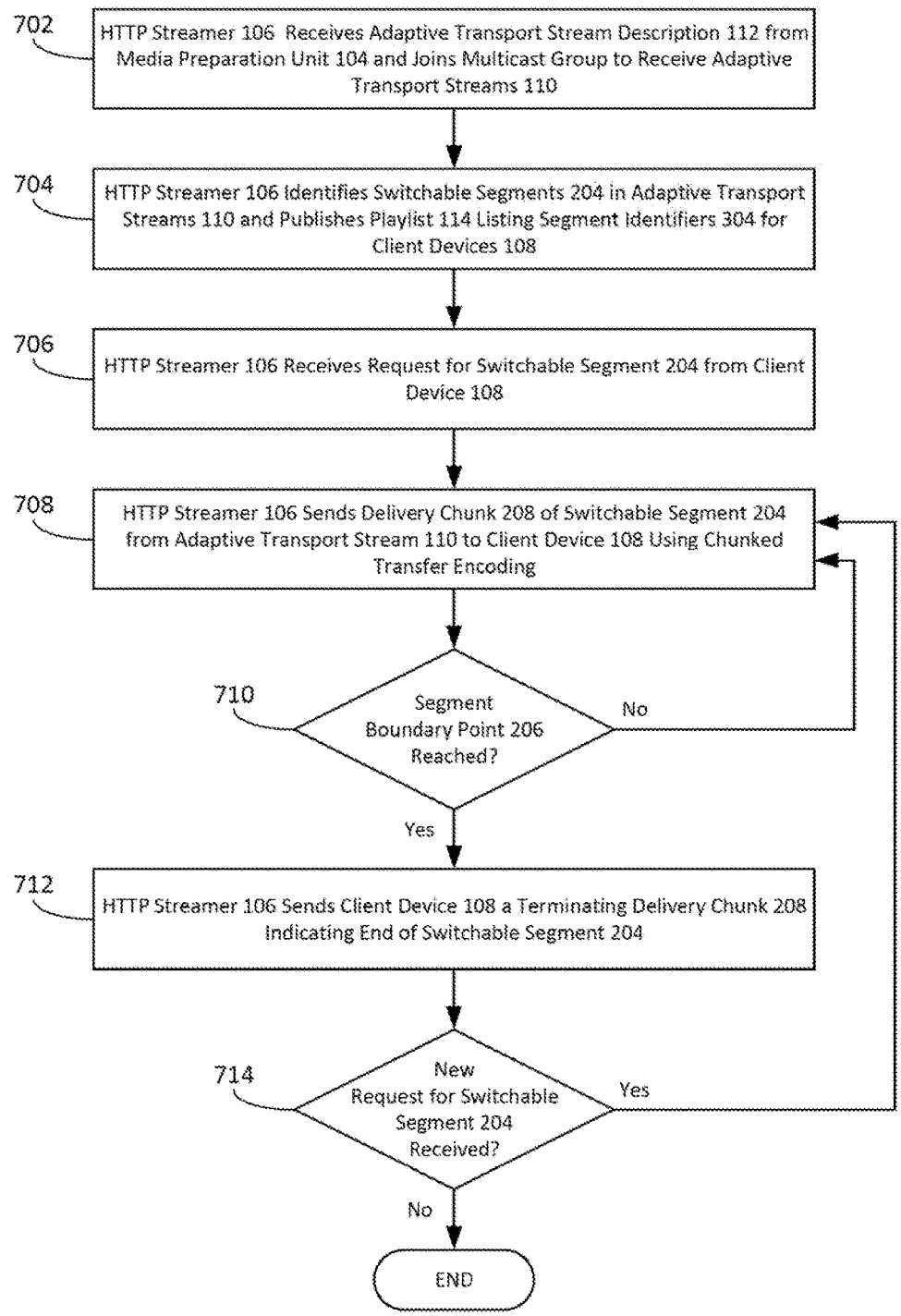
FIG. 7 depicts a second exemplary process for transmitting an adaptive transport stream from an HTTP streamer to client devices using chunked transfer encoding.

FIG. 7 depicts a second exemplary process for transmitting data from one or more adaptive transport streams 110 from an HTTP streamer 106 to client devices 108 using chunked transfer encoding. The process of FIG. 7 can be used when the media content 102 is a live broadcast and client devices 108 desire to play back the live content in near-real time, or when the media content 102 is live or prerecorded and the client devices 108 can seek through the content.

At step 702, the HTTP streamer 106 can receive an adaptive transport stream description 112 from the media preparation unit 104 associated with a piece of media content 102. The adaptive transport stream description 112 can describe information about the media content 102 and one or more associated adaptive transport streams 110 available from the media preparation unit 104, such as different versions of the media content 102 encoded at different bitrates. The media preparation unit 104 can have encoded, or be in the process of encoding, each adaptive transport stream 110 identified in the adaptive transport stream description 112 with segment boundary points 206 that indicate beginning and/or end points of individual switchable segments 204 within the continuous adaptive transport stream 110, as well as chunk boundary points 210 that mark beginning and/or end points of delivery chunks 208 within each switchable segment 204.

After receiving the adaptive transport stream description 112, the HTTP streamer 106 can join a multicast group associated with the media preparation unit 104, and can begin receiving the adaptive transport streams 110 into its memory buffer 402. The HTTP streamer 106 can examine the portions of the adaptive transport stream 110 received in its memory buffer 402 for segment boundary points 206 that mark the beginning of each switchable segment 204 within the adaptive transport streams 110.

At step 704, the HTTP streamer 106 can publish a playlist 114 for client devices 108. The HTTP streamer 106 can list segment identifiers 304 for the identified switchable segments on the playlist 114, as shown in FIG. 3B. As described above, the HTTP streamer 106 can list incomplete switchable segments 204 on the playlist 114, such as switchable segments 204 from a live broadcast that have not been fully received in its memory buffer 402. By way of a non-limiting example, when the HTTP streamer 106 finds a segment boundary point 206 within the received portions of an adaptive transport stream 110 that marks the beginning of a switchable segment 204, it can list a segment identifier 304 for that switchable segment 204 in the playlist 114 even if the full switchable segment 204 has not yet been received from the media preparation unit 104.

In some embodiments, the playlist 114 can be continuously or periodically updated as more of the adaptive transport stream 110 is received from the media preparation unit 104. By way of a non-limiting example, when the media preparation unit 104 sends a live broadcast as one or more adaptive transport streams 110 to the HTTP streamer 106, the HTTP streamer 106 can publish an initial version of the playlist 114 that lists a segment identifier 304 for a beginning switchable segment 204 as soon as it begins to receive adaptive transport streams 110 from the media preparation unit 104. As more of the live broadcast is received, and as additional segment boundary points 206 are encountered that mark the end of one switchable segment 204 and the beginning of the next switchable segment 204, the HTTP streamer 106 can publish a new playlist 114 or update a previous version of the playlist 114 to add a segment identifier 304 for the additional switchable segment 204.

At step 706, the HTTP streamer 106 can receive a request for a switchable segment 204 from a client device 108. By way of a non-limiting example, a client device 108 can use one of the segment identifiers 304 on the playlist 114 to request the switchable segment 204 most recently listed in the published playlist 114 in order to play back the media content 102 in near real-time. As another non-limiting example, the client device 108 can request a switchable segment 204 listed elsewhere in the playlist 114 to skip back to an earlier point in the video.

At step 708, the HTTP streamer 106 can used chunked transfer encoding to transmit a delivery chunk 208 from the requested switchable segment 204 to the requesting client device 108. In some embodiments, the HTTP streamer 106 can use zero-copy segmentation to send data associated with the requested switchable segment 204 directly to the requesting client device 108 from its memory buffer 402. The first delivery chunk 208 sent in response to the client device's request for the most recent switchable segment 204 can be the most recent full delivery chunk 208 held in the HTTP streamer's memory buffer 402. The HTTP streamer 106 can use chunk boundary points 210 inserted by the media preparation unit 104 to identify the delivery chunks 208 within the portion of the adaptive transport stream 110 held in its memory buffer 402. By way of a non-limiting example, FIG. 6A depicts a switchable segment 204 that has been partially received within the HTTP streamer's memory buffer 402. Although only a few frames 202 have been received in memory out of the full switchable segment 204, a full delivery chunk 208 bounded by chunk boundary points 210 have been received and the HTTP streamer 106 can send that delivery chunk 208 to a requesting client device 108. As the media preparation unit 104 inserted the chunk boundary points 210 within the adaptive transport stream 110 to mark independently decodable portions of the media content 102, the client device 108 can immediately begin decoding the delivery chunk 208 and playing back its frames 202 even if other parts of the switchable segment 204 have not yet been received.

The HTTP streamer 106 can track its location within the switchable segment 204 when responding to a request from a client device 108, such that the next delivery chunk 208 after the most recently sent delivery chunk 208 can be subsequently sent to the client device 108 if appropriate. By way of a non-limiting example, FIG. 6B depicts a situation in which the HTTP streamer 106 has already sent a first delivery chunk 208 from a switchable segment 204 to a requesting client device 108, and follows by sending a second delivery chunk 208 from the same switchable segment when it receives and detects a chunk boundary point 210 indicating the end of the second delivery chunk 208.

At step 710, the HTTP streamer 106 can determine if it has reached a segment boundary point 206 within the adaptive transport stream 110. If, after sending a delivery chunk 208 to the client device 108 the HTTP streamer 106 has not yet reached a segment boundary point 206 within the adaptive transport stream 110, the HTTP streamer 106 can return to step 708 to transmit the next delivery chunk 208 from the requested switchable segment 204 to the requesting client device 108 using chunked transfer encoding. However, if the HTTP streamer 106 determines during step 710 that it has reached a segment boundary point 206 within the adaptive transport stream 110, the HTTP streamer 106 can determine that it has reached the endpoint of the current switchable segment 204, and can move to step 712. By way of a non-limiting example, FIGS. 6B-6C depicts a situation in which the HTTP streamer 106 sends a delivery chunk 208 to a client device 108 and then encounters a segment boundary point 206 as the next piece of data within the portion of the adaptive transport stream 110 in its memory buffer 402.

At step 712, the HTTP streamer 106 can transmit a terminating delivery chunk 208 to the client device 108, to indicate the end of the switchable segment 204 that was requested by the client device 108. As described above, in some embodiments the terminating delivery chunk 208 can have a length of zero. The terminating delivery chunk 208 can indicate to the requesting client device 108 that the last delivery chunk 208 associated with the requested switchable segment 204 has been sent, and the end of the switchable segment 204 has been reached.

After receiving a terminating delivery chunk 208, the client device 108 can either use the playlist 114 to request the next switchable segment 204 from an adaptive transport stream 110 at the same or a different quality level, or end playback of the media content 102.

During step 714 the HTTP streamer 106 can determine whether a new request for a switchable segment 204 has been received from the requesting client device 108. If the client device 108 has requested another switchable segment 204, the HTTP streamer 106 can return to step 708 to begin transmitting delivery chunks 208 of the requested switchable segment 204 to the client device 108. If the client device 108 has not requested an additional switchable segment 204, the process can end, and/or the HTTP streamer 106 can wait for future requests for switchable segments 204.

The processes of FIGS. 5 and 7 can reduce or substantially eliminate tuning delays when a client device 108 initially requests a live video stream. By way of a non-limiting example, in FIG. 5 a client device 108 can use the virtual identifiers 302 on the playlist 114 to automatically request a version of the newest switchable segment 204 from the live video stream, even if the HTTP streamer 106 has not yet received that newest switchable segment in full. By way of another non-limiting example, in FIG. 7 the HTTP streamer 106 can list a new switchable segment 204 on the playlist 114 immediately after finding a beginning segment boundary point 206 in the adaptive transport stream 110, even if the HTTP streamer 106 has not yet received that new switchable segment in full, and a client device 108 can request that new switchable segment 202 as soon as it appears on the playlist 114.

As the delivery chunks 208 can be independently decodable portions of larger switchable segments 204, the HTTP streamer 106 can respond to a request for a switchable segment 204 by sending individual delivery chunks 208 to the requesting client device 108, even if the HTTP streamer 106 has not yet received the full switchable segment 204. As such, the client device 108 can begin playing back live video with a delay of only the size of a delivery chunk 208 after the adaptive transport stream 110 is received by the HTTP streamer 106, instead of waiting for the HTTP streamer 106 to receive a complete switchable segment 204 and for that complete switchable segment 204 to be in turn sent to the client device 108. As delivery chunks 208 can be sized as single or partial GOPs, or even individual frames 202, initial tuning delays can be minimized. This minimization of initial tuning times in turn can minimize latency in playing back subsequent portions of live content.

Figure 8:
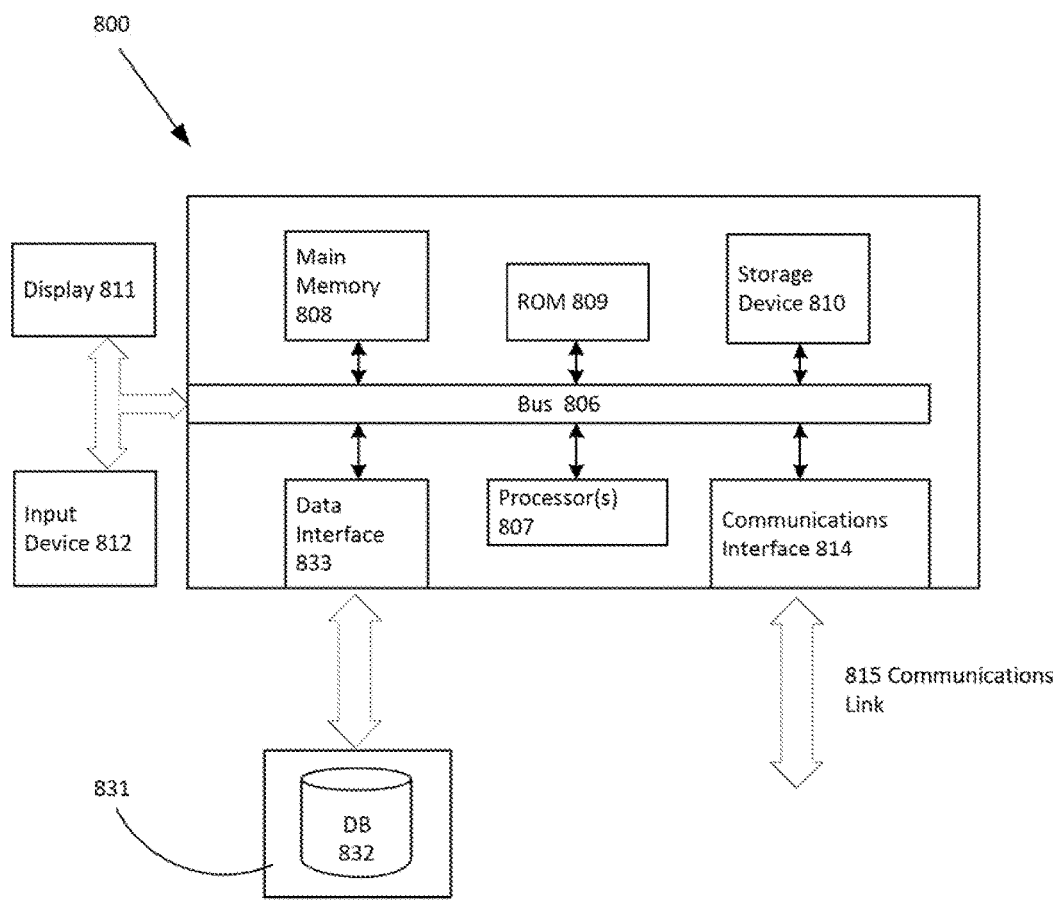
FIG. 8 depicts a block diagram of an exemplary embodiment of a computer system.

The execution of the sequences of instructions required to practice the embodiments may be performed by one or more computer systems 800 as shown in FIG. 8. By way of non-limiting examples, the media preparation unit 104, HTTP streamer 106, and/or client devices 108 can be computer systems 800. Although a description of one computer system 800 may be presented herein, it should be understood that any number of computer systems 800 may be employed in communication with one another.

A computer system 800 according to one embodiment will now be described with reference to FIG. 8, which is a block diagram of the functional components of a computer system 800. As used herein, the term computer system 800 is broadly used to describe any computing device that can store and independently run one or more programs.

The computer system 800 can include a communication interface 814 coupled to the bus 806. The communication interface 814 can provide two-way communication between computer systems 800. The communication interface 814 of a respective computer system 800 can transmit and receive electrical, electromagnetic or optical signals that include data streams representing various types of signal information, such as instructions, messages and data. A communication link 815 can link one computer system 800 with another computer system 800. For example, the communication link 815 can be a LAN, an integrated services digital network (ISDN) card, a modem, or the Internet.

A computer system 800 can transmit and receive messages, data, and instructions, including programs, such as applications or code, through its respective communication link 815 and communication interface 814. Received program code can be executed by the respective processor(s) 807 as it is received, and/or be stored in the storage device 810, or other associated non-volatile media, for later execution.

In some embodiments, the computer system 800 can operate in conjunction with a data storage system 831, such as a data storage system 831 that contains a database 832 that is readily accessible by the computer system 800. The computer system 800 can communicate with the data storage system 831 through a data interface 833.

A computer system 800 can include a bus 806 or other communication mechanism for communicating the instructions, messages and data, collectively information, and one or more processors 807 coupled with the bus 806 for processing information. A computer system 800 can also include a main memory 808, such as a random access memory (RAM) or other dynamic storage device, coupled to the bus 806 for storing dynamic data and instructions to be executed by the processor(s) 807. The computer system 800 can further include a read only memory (ROM) 809 or other static storage device coupled to the bus 806 for storing static data and instructions for the processor(s) 807. A storage device 810, such as a magnetic disk or optical disk, can also be provided and be coupled to the bus 806 for storing data and instructions for the processor(s) 807.

A computer system 800 can be coupled via the bus 806 to a display device 811, such as an LCD screen. An input device 812, such as alphanumeric keys and/or other keys, can be coupled to the bus 806 for communicating information and command selections to the processor(s) 807.

According to one embodiment, an individual computer system 800 performs specific operations by its respective processor(s) 807 executing one or more sequences of one or more instructions contained in the main memory 808. Such instructions can be read into the main memory 808 from another computer-usable medium, such as the ROM 809 or the storage device 810. Execution of the sequences of instructions contained in the main memory 808 can cause the processor(s) 807 to perform the processes described herein. In alternate embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method of transmitting media content, comprising:
   receiving an adaptive transport stream description at an HTTP streamer from a media preparation unit, the adaptive transport stream description describing media content available from the media preparation unit as one or more adaptive transport streams, wherein each of said one or more adaptive transport streams are continuous streams comprising a plurality of switchable segments each comprising one or more delivery chunks, the switchable segments being marked with segment boundary points and the delivery chunks being marked with chunk boundary points, wherein positions between each of said plurality of switchable segments are positions at which a client device can switch to a different one of said one or more adaptive transport streams;
   publishing a playlist with said HTTP streamer listing identifiers for one or more of said plurality of switchable segments, the switchable segments including delivery chunks;
   receiving said one or more adaptive transport streams into a memory buffer at said HTTP streamer from said media preparation unit;
   receiving a request at said HTTP streamer from said client device for a particular switchable segment identified on said playlist to be received at a requested bit rate;
   responding to said request in the HTTP streamer by processing the received one of more adaptive transport streams on the fly in real time by;
      continuing receipt of delivery chunks of a switchable segment prior to the particular switchable segment until the delivery chunks reach a segment boundary point;
      identifying boundary marks of the one or more chunks in only the particular switchable segment; and
      transmitting the one or more delivery chunks from said particular switchable segment at the requested bit rate to said client device using HTTP chunked transfer encoding until a terminating segment boundary point is reached,
      wherein each of said one or more delivery chunks are portions of the particular switchable segment that are independently decodable by said client device, such that said HTTP streamer is configured to begin sending delivery chunks from a requested switchable segment so that said client device begins decoding and rendering received delivery chunks when said HTTP streamer has not yet received additional ones of the switchable segments from said media preparation unit.

2. The method of claim 1, wherein said media content is a live broadcast.

3. The method of claim 1, wherein said segment boundary points are encoder boundary points inserted in private data when said media content is encoded according to an OpenCable standard.

4. The method of claim 1, wherein said segment boundary points are inserted in public data.

5. The method of claim 1, wherein said HTTP streamer publishes virtual identifiers on said playlist, said virtual identifiers each pointing to the switchable segment most recently received in part or in full from said media preparation unit.

6. The method of claim 1, wherein said HTTP streamer publishes segment identifiers on said playlist, said segment identifiers each pointing to a full or partial switchable segment identified by said HTTP streamer from opening and/or closing segment boundary points within said one or more adaptive transport streams.

7. The method of claim 6, wherein said HTTP streamer adds a new segment identifier to said playlist when it encounters a beginning segment boundary point marking the start of a new switchable segment in said one or more adaptive transport streams.

8. The method of claim 1, further comprising sending a terminating delivery chunk of length zero to said client device when said terminating segment boundary point is reached.

9. The method of claim 1, further comprising sending each of said delivery chunks to said client device using zero-copy segmentation within said memory buffer, wherein bits in said memory buffer that correspond to a single delivery chunk as identified by opening and/or closing chunk boundary points are transmitted directly from said memory buffer to said client device.

10. The method of claim 1, wherein the HTTP streamer receives the adaptive transport streams well prepared including all the boundary marks identified and labeled for the switchable segments, and wherein the HTTP streamer sends the chunks incrementally in response to the client's media request.

* * * * *